United States Patent
Snipes et al.

(10) Patent No.: US 10,256,753 B2
(45) Date of Patent: Apr. 9, 2019

(54) AC MOTOR SYSTEMS WITH DRIVE CIRCUITS AND METHODS OF USE

(71) Applicant: Regal Beloit America, Inc., Beloit, WI (US)

(72) Inventors: Paul Bryan Snipes, Tipp City, OH (US); Luis D. Morales, Fort Wayne, IN (US); Maung Saw Eddison, Fort Wayne, IN (US); Zachary Joseph Stauffer, Fort Wayne, IN (US); Ludovic Andre Chretien, Columbia City, IN (US); Lester Benjamin Manz, Paulding, OH (US)

(73) Assignee: Regal Beloit America, Inc., Beloit, WI (US)

(*) Notice: Subject to any disclaimer, the term of this patent is extended or adjusted under 35 U.S.C. 154(b) by 42 days.

(21) Appl. No.: 15/454,643

(22) Filed: Mar. 9, 2017

(65) Prior Publication Data
US 2018/0262132 A1    Sep. 13, 2018

(51) Int. Cl.
| | | |
|---|---|---|
| G05B 5/00 | (2006.01) |
| H02H 7/08 | (2006.01) |
| H02P 1/04 | (2006.01) |
| H02P 3/00 | (2006.01) |
| H02P 5/00 | (2016.01) |
| H02P 6/08 | (2016.01) |
| H02P 25/04 | (2006.01) |
| H02P 23/00 | (2016.01) |
| H02P 25/024 | (2016.01) |
| H02P 25/18 | (2006.01) |

(52) U.S. Cl.
CPC ............ *H02P 6/08* (2013.01); *H02P 23/0004* (2013.01); *H02P 25/024* (2016.02); *H02P 25/04* (2013.01); *H02P 25/18* (2013.01); *H02P 25/188* (2013.01); *H02P 2207/01* (2013.01); *H02P 2207/05* (2013.01)

(58) Field of Classification Search
CPC ........................................................ H02P 6/08
USPC .......................................................... 318/461
See application file for complete search history.

(56) References Cited

U.S. PATENT DOCUMENTS

| | | | |
|---|---|---|---|
| 4,939,441 A | 7/1990 | Dhyanchand | |
| 5,068,590 A | 11/1991 | Glennon et al. | |
| 7,081,735 B1 | 7/2006 | Malkowski, Jr. et al. | |
| 7,193,826 B2 | 3/2007 | Crane et al. | |
| 7,558,031 B2 | 7/2009 | Boren | |
| 7,598,628 B2 | 10/2009 | Zver et al. | |
| 7,800,339 B2 | 9/2010 | Gonzalez et al. | |
| 7,948,721 B2 | 5/2011 | Brunner et al. | |
| 7,952,316 B2 | 5/2011 | Ganev et al. | |
| 8,014,110 B2* | 9/2011 | Schnetzka | F25B 49/025 318/434 |
| 8,779,698 B2 | 7/2014 | Havard et al. | |
| 9,018,882 B2* | 4/2015 | Mack | H02P 27/06 318/494 |
| 9,450,530 B2 | 9/2016 | Zahora et al. | |

(Continued)

*Primary Examiner* — Erick Glass
(74) *Attorney, Agent, or Firm* — Armstrong Teasdale LLP

(57) ABSTRACT

An alternating current (AC) motor system and control methods are provided herein. The AC motor system includes a motor having a first rated horsepower and configured to be coupled to a power source, and a drive circuit configured to be electrically coupled between the power source and the motor. The drive circuit has a second rated horsepower that is lower than the first rated horsepower.

23 Claims, 6 Drawing Sheets

(56) References Cited

U.S. PATENT DOCUMENTS

| | | | |
|---|---|---|---|
| 9,800,188 B2* | 10/2017 | Chretien | ............ H02P 1/426 |
| 2005/0057213 A1* | 3/2005 | Williams | ............ H02P 4/00 |
| | | | 318/811 |
| 2008/0290824 A1 | 11/2008 | Choi et al. | |

* cited by examiner

AC MOTOR SYSTEMS WITH DRIVE CIRCUITS AND METHODS OF USE

BACKGROUND

The field of the disclosure relates generally to alternating current (AC) motors, and more specifically to an AC motor with a drive circuit.

At least some known AC motors are fixed speed motors that are driven by applying line input voltage directly to the motor through a contactor or relay in an across-the-line architecture. Such AC motors are most efficient when operating at full speed and at line frequency. During low load conditions where full speed operation is not necessary, use of the line input voltage causes such AC motors to be operated at a higher power level than necessary, which reduces efficiency. Variable frequency drives (VFDs) enable driving AC motors at variable speeds within the motors' operating ranges. This variable speed control using VFDs increases the efficiency of operating the AC motors at less than full speeds, as compared to the across-the-line architecture. However, such VFDs are expensive and may even exceed the cost of the AC motor in some cases. Additionally, using a VFD to controllably increase voltage magnitude up to the AC motor's rated voltage or horsepower may require a large-sized VFD having a voltage or horsepower rating that is substantially equal to that of the AC motor. VFD's add approximately 3-5% more losses that a motor-only design would not have when running off of line voltage. Because of this increase of loss, to maintain the same high-speed efficiency as a system having a VFD, the active material content in the motor design must increase. This may include increasing a frame size of the motor or increasing a length of the existing frame by adding additional windings and steel material.

Single-speed AC induction motors are commonly used in air and water moving applications due to their low cost and high efficiency when operated at line frequency. Recent environmental regulations and standards require lower speed operation of motors used in the air and water moving applications to improve efficiency. One method of providing lower speed operation includes adding a second winding to a single-speed AC induction motor, to provide high speed operation when using the first winding and low speed operation when using the second winding. However, adding a second winding typically requires increasing the frame size of the AC induction motor, which is cost-prohibitive. Another method includes adding a VFD to the AC induction motor, which as described above, adds significant size and cost to the motor.

BRIEF DESCRIPTION

In one aspect, an alternating current (AC) motor system is provided. The AC motor system includes a motor having a first rated horsepower and configured to be coupled to a power source, and a drive circuit configured to be electrically coupled between the power source and the motor. The drive circuit has a second rated horsepower that is lower than the first rated horsepower.

In another aspect, a method is provided that includes providing a motor that has a first rated horsepower and is configured to be coupled to a power source. The method also includes electrically coupling a drive circuit between the power source and the motor. The drive circuit has a second rated horsepower that is lower than the first rated horsepower of the motor. The drive circuit includes a drive circuit controller.

DETAILED DESCRIPTION

As used herein, an element or step recited in the singular and preceded with the word "a" or "an" should be understood as not excluding plural elements or steps, unless such exclusion is explicitly recited. Furthermore, references to "example implementation" or "one implementation" of the present disclosure are not intended to be interpreted as excluding the existence of additional implementations that also incorporate the recited features.

Figure 1:
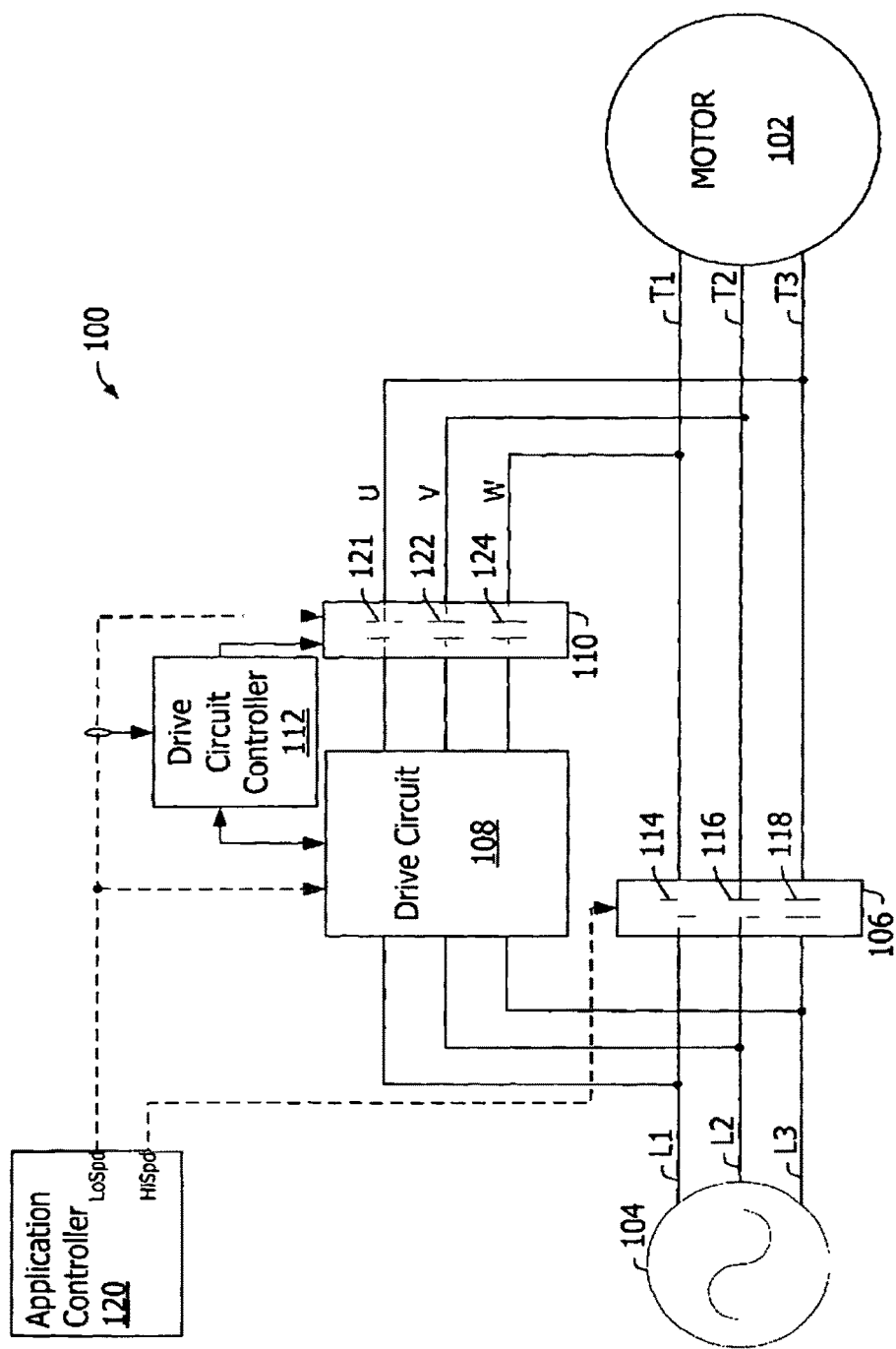
FIG. 1 is a block diagram of an exemplary motor system.

FIG. 1 is a block diagram of an exemplary motor system 100. Motor system 100 includes a motor 102, a power source 104, a bypass contactor 106, a drive circuit 108, a drive output contactor 110, and a drive circuit controller 112.

In the exemplary embodiment, motor 102 is an AC induction motor or an electrically commutated motor (e.g., a permanent magnet AC motor with an integrated drive). In other embodiments, motor 102 may be any type of electric motor, including for example, a permanent magnet synchronous motor (PMSM), a stepper motor, any motor coupled to a variable frequency drive, etc. In some embodiments, motor 102 may be used in air moving applications used in the heating, ventilation, and air conditioning (HVAC) industry, may be used in fluid pumping applications, and/or may be used in commercial and industrial applications. In other embodiments, motor 102 may engage any suitable work component and be configured to drive such a work component. Motor 102 is a three-phase motor and includes motor conductors T1, T2, and T3 coupled to an input of motor 102 that are respectively coupled to each of the three phases of motor 102.

Motor 102 includes a first rated horsepower (HP) defining an amount of work motor 102 can be expected to do, a first rated voltage defining a specific voltage level or a combination of voltage levels (for dual-voltage or tri-voltage motors) at which motor 102 yields optimal performance, and a first rated speed defining an approximate speed of motor 102 when operated at rated voltage and frequency. For example, a motor may have a 4.9 HP rating with a 230V/460V voltage rating and a 1725 RPM speed rating. Motor 102 is configured to operate most efficiently at full speed where AC input power is applied directly to motor 102.

Motor assembly 100 is configured to be coupled to a power source 104 for receiving input power to drive motor 102. In the exemplary embodiment, power source 104 is an AC power source that generates three-phase AC power on line conductors L1, L2, and L3. Although described herein as being a three-phase power source, in some embodiments, power source 104 may generate single-phase AC power. Power source 104 provides three-phase, fixed voltage, and fixed frequency AC power from an AC power grid or distribution system (e.g., "utility" or "mains") that is present at an installation site of motor 102. Power source 104 may supply AC voltage or line voltage of 200V, 230V, 380V, 460V, or 600V, at a line frequency of 50 Hz or 60 Hz, onto line conductors L1, L2, and L3 depending on the corresponding AC power grid. Alternatively, power source 104 may supply any other voltage and or frequency that enables motor system 100 to function as described herein.

Bypass contactor 106 is coupled in series between power source 104 and motor conductors T1, T2, and T3 of motor 102. Bypass contactor 106 includes a first switch 114, a second switch 116, and a third switch 118, each coupled in series to three-phase power source 104 via respective line conductors L1, L2, and L3 (one conductor per phase). Alternatively, bypass contactor 106 may be a relay or any other switching device that enables bypass contactor 106 to function as described herein. Bypass contactor 106 is configured to close in response to receiving a high-speed command signal from an application controller 120 to operate motor 102 at its high-speed operating point. Alternatively, the high-speed command signal may be transmitted to drive circuit 108, and drive circuit 108 controls operation of bypass contactor 106. In the exemplary embodiment, the high-speed command signal from application controller 120 directly closes bypass contactor 106 by energizing and closing switches 114, 116, and 118. This facilitates coupling power source 104 directly to motor 102. At high-speeds, line voltage from power source 104 is approximately equal to the first rated operating point associated with motor 102. By coupling power source 104 directly to motor 102, motor 102 is operated at full-rated speed using line voltage and frequency. This is the most efficient operating point of motor 102.

Drive circuit 108 is coupled to line conductors L1, L2, and L3 of power source 104 at an input side and to motor conductors T1, T2, and T3 of motor 102 on an output side. Additionally, drive circuit 108 and optional series-coupled drive output contactor 110 are electrically coupled in parallel to bypass contactor 106. In the exemplary embodiment, drive circuit 108 is configured to convert AC power received from power source 104 to an AC power having a desired voltage and desired frequency to drive motor 102 at a low-speed operating point. Drive circuit 108 includes a second HP rating that is lower than the first HP rating of motor 102. In some embodiments, the second HP rating of drive circuit 108 is about ⅔ of the first HP rating of motor 102. In other embodiments, the second HP rating of drive circuit 108 is about ½ of the first HP rating of motor 102. However, drive circuit 108 may have any other rated HP that is lower than the first rated HP of motor 102 and enables drive circuit 108 to function as described herein. Drive circuit 108 enables use of the same physically smaller sized frame of AC motors in use today, while also providing at least one low-speed operating point. Motor 102 and drive circuit 108 are not merely limited to two-speed operation; however, drive circuit 108 is capable of having any number of operating points so long as they do not exceed the rated HP of drive circuit 108.

Additionally, drive circuit 108 has a second rated voltage and a second rated speed, both of which are lower than the first rated voltage and the first rated speed associated with motor 102. That is, rather than motor system 100 including a VFD sized for the full operational range of motor 102 as with known motor systems, drive circuit 108 is sized for lower HP operation than motor 102 in order to improve efficiency at low-speeds and prevent having to increase the frame size of motor 102.

In one embodiment, motor 102, drive circuit 108 and/or drive output contactor 110 are all included within an integrated motor package. The integrated package is configured to be coupled to power source 104 and bypass contactor 106. Alternatively, motor 102, drive circuit 108 and/or drive output contactor 110 may be separate components that are coupled together. Moreover, bypass contactor 106 may be included within the integrated motor package along with motor 102, drive circuit 108 and/or drive output contactor 110.

Figure 2:
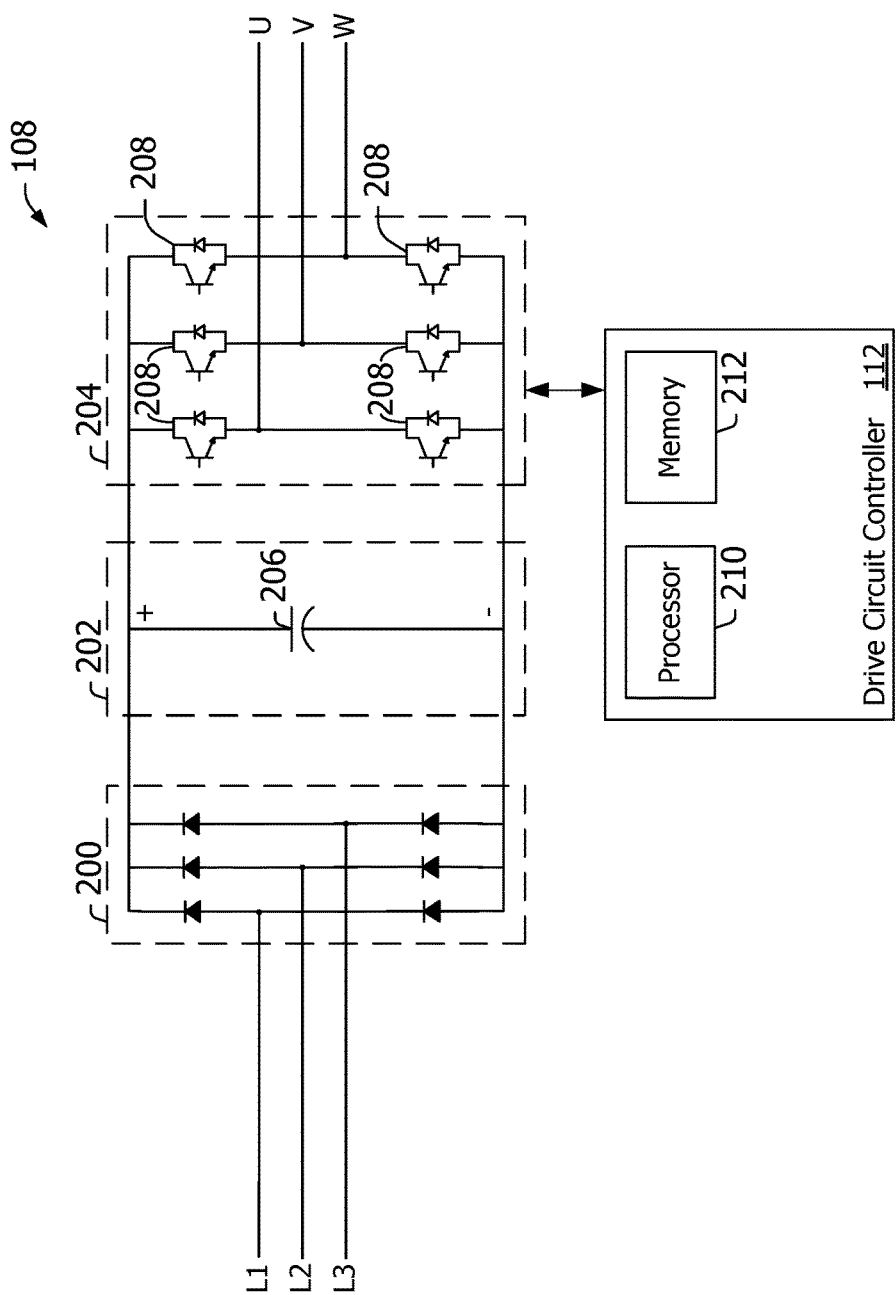
FIG. 2 is a schematic diagram of a drive circuit for use in the motor system shown in FIG. 1.

FIG. 2 is a schematic diagram of drive circuit 108 (shown in FIG. 1). Drive circuit 108 includes three stages: a converter 200, a DC link 202, and an inverter 204. Converter 200 converts the fixed line frequency, fixed line voltage AC power from AC source 104 into DC power. For example, in the exemplary embodiment, converter 200 is a full wave bridge rectifier that converts three-phase AC power to DC power. DC link 202 filters the DC power from converter 200 using a filter 206, such as one or more capacitors. DC link 202 has rails labeled "+" and "−". Inverter 204 converts the DC power from DC link 202 into variable frequency, variable voltage AC power for motor 102. Inverter 204 is a pulse width modulation (PWM) inverter, using six switching devices 208, for example, IGBTs or MOSFETs. Switching devices 208 are connected in a three-phase bridge configuration to DC link 202 to develop power at inverter output terminals U, V, and W. Switching devices 208 are pulse width modulated by signals on lines from drive circuit controller 112 (shown in FIG. 1).

Drive circuit controller 112 includes a processor 210 and a memory device 212. In the exemplary embodiment, drive circuit controller 112 is implemented in one or more processing devices, such as a microcontroller, a microprocessor, a programmable gate array, a reduced instruction set circuit (RISC), an application specific integrated circuit (ASIC), etc. Accordingly, in this exemplary embodiment, drive circuit controller 112 is constructed of software and/or firmware embedded in one or more processing devices. In this manner, drive circuit controller 112 is programmable, such that instructions, intervals, thresholds, and/or ranges, etc. may be programmed for a particular motor 102 and/or an operator of motor 102. Drive circuit controller 112 may be wholly or partially provided by discrete components, external to one or more processing devices.

Processor 210 is coupled to inverter 204 to control switching devices 208 to output AC voltage for driving motor within the limits of the second HP rating of drive circuit 108. Processor 210 is further coupled to drive circuit 108 to control the speed at which motor 102 is operated when operated by drive circuit 108 based on settings stored in memory 212.

Referring back to FIG. 1, system 100 may further include drive output contactor 110 coupled in series between drive circuit 108 and motor conductors T1, T2, and T3 of motor 102. Drive output contactor 110 includes a first switch 121, a second switch 122, and a third switch 124, each coupled in series to drive circuit 108 via respective output terminals U, V, and W. Alternatively, drive output contactor 110 may be a relay or any other switching device that enables drive output contactor 110 to function as described herein. When a low-speed command is received from application controller 120, drive output contactor 110 is configured to close to couple drive circuit 108 to motor 102 to enable drive circuit 108 to provide AC voltage to motor 102 at the low-speed operating point.

In the exemplary embodiment, drive circuit controller 112 is configured to control drive output contactor 110 in response to the command signal from application controller 120. More specifically, drive circuit controller 112 monitors the speed command signal provided by application controller 120 to drive circuit 108 and/or drive output contactor 110 to determine whether to utilize drive circuit 108. If a low-speed command signal is detected, drive circuit controller 112 closes drive output contactor 110, enabling drive circuit 108 to generate and provide output voltage to motor 102 that is within the second rated voltage of drive circuit 108.

When monitoring the speed command signal provided by application controller 120 and determining that a high-speed command signal is detected, drive circuit controller 112 may be further configured to control and close bypass contactor 106, causing power source 104 to be directly coupled to motor 102 for operating motor 102 at full-rated speed using line voltage and frequency.

In some embodiments, drive circuit controller 112 may include protective protocols that compare the received speed command signals of drive circuit 108 and drive output contactor 110 to make sure they are both getting the same command to be open or closed. Additionally, or alternatively, drive circuit controller 112 is configured monitor the command signals provided by application controller 120 to drive output contactor 110 and bypass contactor 106, and monitor voltage at drive output terminals U, V, and W to determine when to operate drive circuit 108 without damage. For example, drive circuit controller 112 ensures that voltage at drive output terminals U, V, and W does not exceed a threshold before drive circuit 108 is powered-on and drive output contactor 110 is closed because powering-on when line voltage is present may damage drive circuit 108 and/or motor 102. This monitoring and self-protection feature performed by drive circuit controller 112 eliminates the need for an additional circuit breaker that is typically required for protection during such operations.

As described above, drive circuit 108 is sized for lower HP operation than motor 102. For example, depending on the application in which motor 102 is to be installed, drive circuit 108 may be selected to have a ⅔ HP rating or a ½ HP rating relative to the first HP rating of motor 102. However, drive circuit 108 is not limited to these specific reduced HP ratings, but may be provided with any desired HP rating that is lower than the first HP rating of motor 102.

Drive circuit 108 is only used to drive motor 102 for low-speed operating points, below full-load operation. In the exemplary embodiment, drive circuit 108 is configured to provide a low-speed operating point for motor 102, such that motor 102 may be driven with at least two speeds, a low-speed (using drive circuit 108) and a high-speed (using power source 104). One low-speed operating point or a few different low-speed operating points may be defined in drive circuit 108, so long as the second HP rating of drive circuit 108 is not exceeded.

The following example is for explanatory purposes only and the claims should not be construed to be limited to only the described values. In an embodiment, motor 102 is a 4.9 HP motor having a 460V voltage rating and a 1725 RPM speed rating. When operated full speed at line input voltage and frequency (60 Hz), the motor operates with an efficiency of about 83%.

If the low-speed operating point is selected to be ⅔ rated relative to the full, high-speed operating point, drive circuit 108 would have a 306V voltage rating and a 1150 RPM speed rating at 40 Hz frequency. This would require drive circuit 108 to have a 1.5 HP rating to operate motor 102 at the low-speed operating point. The lower, second HP rating of drive circuit 108 relative to the first HP rating of motor 102 enables low-speed operation at an efficiency of about 75%.

Alternatively, if an ultra-low speed operating point is selected to be ½ rated relative to the high-speed operating point, drive circuit 108 would have a 230V voltage rating and a 862 RPM speed rating at 30 Hz frequency. This would require drive circuit 108 to have a 0.6 HP rating to operate motor 102 at the ultra-low speed operating point. The lower, second HP rating of drive circuit 108 relative to the first HP rating of motor 102 enables ultra-low speed operation at an efficiency of about 68%.

The lower HP ratings necessary for the lower-rated low-speed operating points enable use of smaller-sized drive circuits for operating motor 102. Thus, motor system 100 facilitates two-speed operation of motor 102 without requiring an increase in motor frame size, length, and/or active material, as is required with known systems that add a fully variable VFD or a second winding to the motor. Further, motor system 100 enables the two-speed operation while meeting the increased legislative standards relating to efficiency and incurring minimal additional cost relative to the known motor systems.

Figure 3:
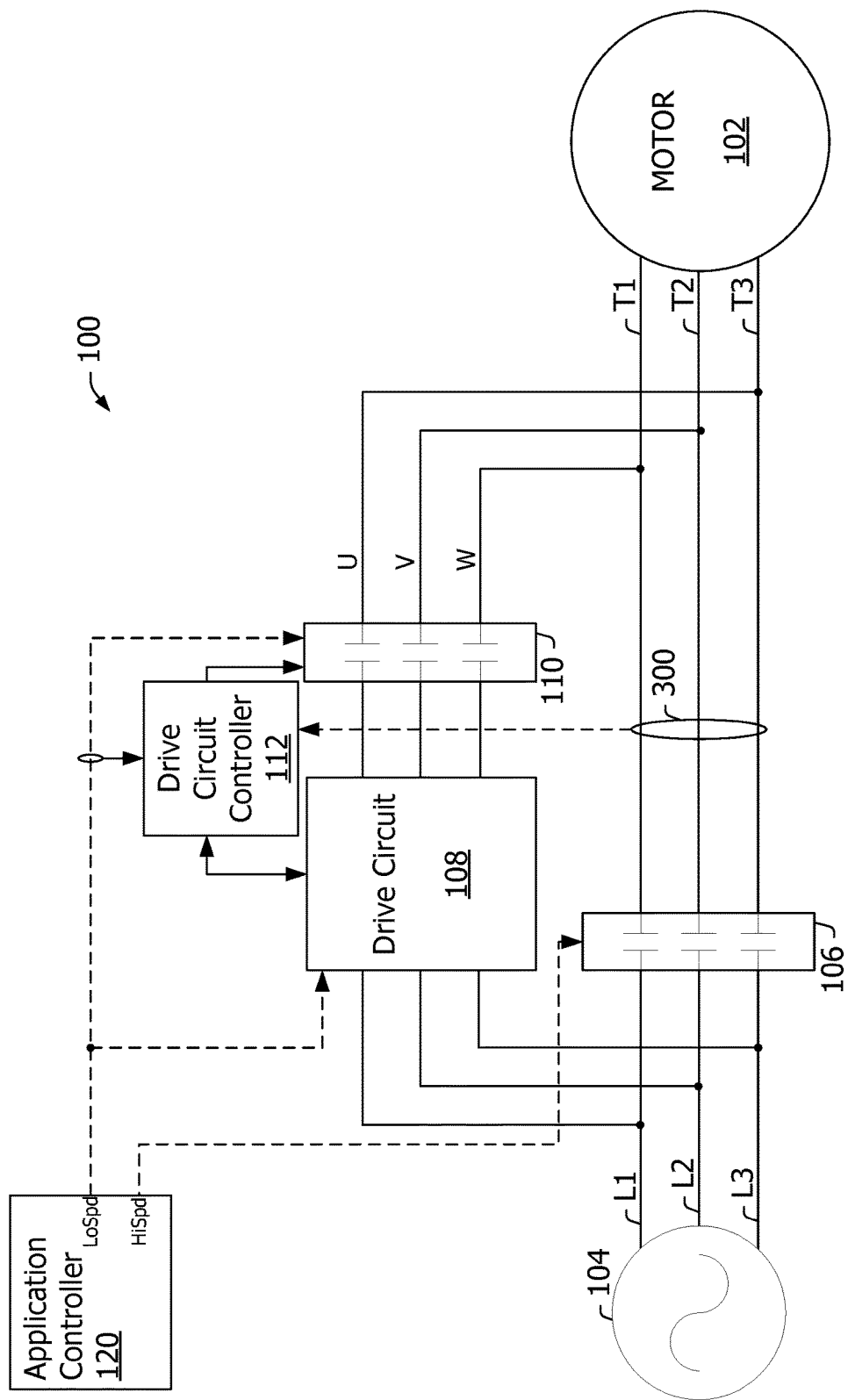
FIG. 3 is a block diagram of the motor system shown in FIG. 1, where the drive circuit controller implements an alternative method of determining whether the bypass contactor is being driven using line current.

FIG. 3 is a block diagram of an exemplary motor system 100 where drive circuit controller 112 implements an alternative method of determining whether bypass contactor 106 is being driven using line current. In the exemplary embodiment, motor system 100 includes a current sensor 300 coupled to output leads of bypass contactor 106. Current sensor 300 measures and transmits current measurement signals to drive circuit controller 112. If current is flowing in the output leads, drive circuit controller 112 determines that motor 102 is operating and line voltage is being applied through the line by power source 104. At this point, drive circuit controller 112 disables drive circuit 108. This enables drive circuit 108 to have no direct contact with the output leads of bypass contactor 106. Rather, the current measurement signal is an induced voltage through current sensor 300.

Figure 4:
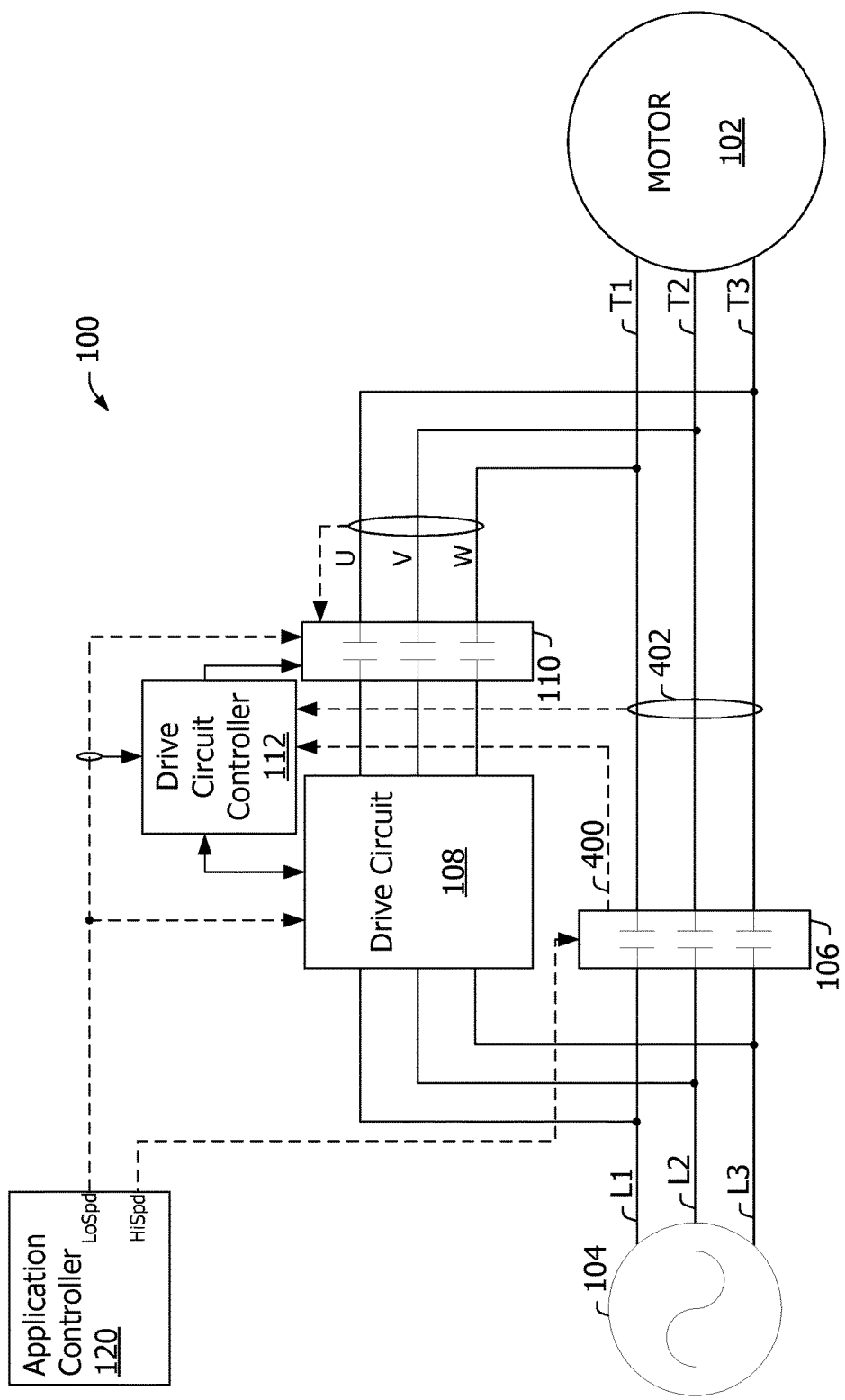
FIG. 4 is a block diagram of the motor system shown in FIG. 1, where the drive circuit controller implements an alternative method of determining whether the bypass contactor is being driven using line voltage or line current.

FIG. 4 is a block diagram of an exemplary motor system 100 where drive circuit controller 112 implements an alternative method of determining whether bypass contactor 106 is being driven using line voltage or line current. In the exemplary embodiment, drive output contactor 110 is a 24 Vdc contactor, rather than a 24 Vac contactor. Drive circuit controller 112 monitors voltage of bypass contactor 106 by measuring 24 Vac coil voltage using a voltage sensor 400 or current of bypass contactor 106 by using a current sensor 402. If either/both conditions are false, indicating that line voltage not present at motor 102, then drive circuit controller 112 activates and closes drive output contactor 110, by providing a +20V (supply) and sinking current through a output pin of drive circuit controller 112. Once drive output contactor 110 is closed, drive circuit controller 112 monitors voltage at drive output terminals U, V, and W to determine if voltage is present prior to drive circuit controller 112 commutating an output. If the voltage at drive output terminals U, V, and W is below a threshold voltage value, drive circuit 108 can operate without damage and drive circuit controller 112 proceeds with controlling drive circuit 108.

Figure 5:
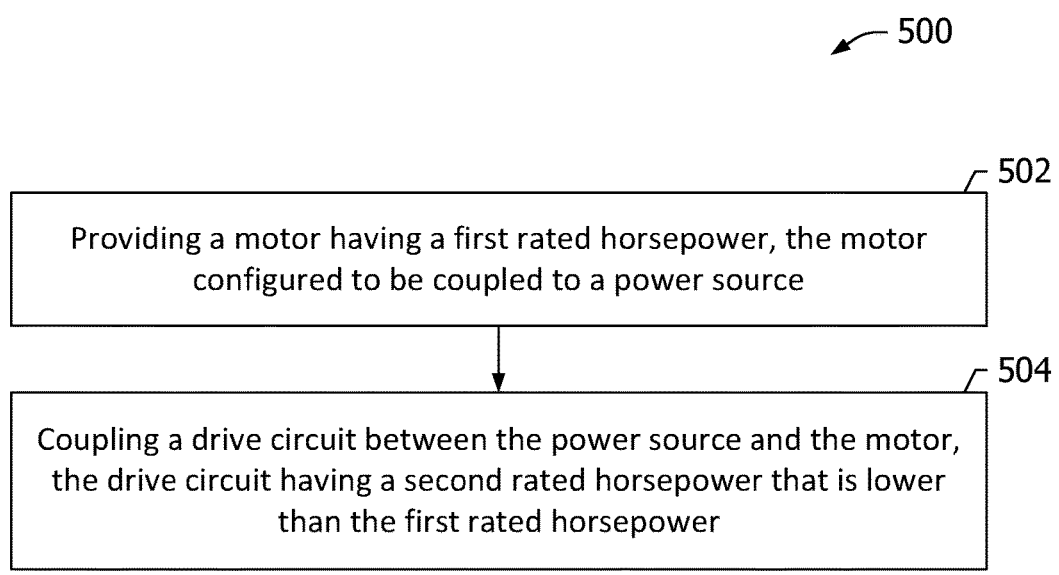
FIG. 5 is an exemplary control method for use with the motor system shown in FIG. 1.

FIG. 5 is an exemplary control method for use with motor system 100, shown in FIG. 1. At step 502, method 500 includes providing a motor having a first rated horsepower, the motor configured to be coupled to a power source. The motor is a three-phase motor and may be an AC induction motor or an ECM. The power source may be either a three-phase AC power source such as a utility or grid, or a single-phase AC source.

At step 504, method 500 includes electrically coupling a drive circuit between the power source and the motor. The drive circuit includes a drive circuit controller and has a second rated horsepower that is lower than the first rated horsepower of the motor. The drive circuit may also have a rated voltage that is less than a rated voltage of the motor.

Method 500 may include electrically coupling a drive output contactor in series between the drive circuit and the motor. The drive circuit controller controls the drive output contactor to enable operation of the motor at the second rated horsepower utilizing the drive circuit. The drive circuit controller controls the drive circuit to operate the motor at one or more lower-speed operating points. This includes options based on application or contactor signal calls that include optionally controlling, by the drive circuit controller, the drive output contactor and/or the bypass contactor.

In one embodiment, method 500 further includes electrically coupling a bypass contactor in parallel to the drive circuit between the power source and the motor. The bypass contactor may be activated to bypass the drive circuit when operating the motor at the first rated horsepower. Additionally, activating the bypass contactor may further include generating a direct coupling of the motor to the power source. Furthermore, activating the bypass contactor may further include receiving a high-speed command signal from an application controller or any other suitable control element, including drive circuit 108 (shown in FIG. 1), which includes an instruction to operate the motor at a high-speed operating point. The motor is then operated at a rated voltage of the motor using line voltage received from the power source.

In another embodiment, method 500 may also include receiving, by the drive circuit controller, a low-speed command signal from an application controller. The low-speed command signal includes an instruction to operate the motor at a low-speed operating point. The drive circuit converts power received from the power source into AC power having a desired voltage and desired frequency in accordance with the low-speed operating point. The drive circuit controller then activates the drive output contactor to couple the drive circuit to the motor, and drives the motor using the AC power from the drive circuit.

In another embodiment, method 500 includes monitoring, by the drive circuit controller, a speed command signal transmitted by an application controller. The drive circuit controller determines whether the speed command signal is a low-speed command signal. When a low-speed command signal is determined, the drive circuit controller activates a drive output contactor to enable the drive circuit to provide output voltage to the motor in accordance with the low-speed command signal.

In a further embodiment, method 500 includes monitoring, by the drive circuit controller, a speed command signal provided by an application controller to determine if operation of the drive circuit is called. When the determination indicates operation of the drive circuit is called, the drive circuit controller monitors voltage at drive output terminals of the drive circuit. The drive circuit controller compares the monitored voltage to a predetermined threshold value. When the monitored voltage is equal to or exceeds the predetermined threshold value, the drive circuit controller prevents operation of the drive circuit to avoid damage. The monitored voltage meeting the predetermined threshold indicates that line voltage from the power source is present on the drive output terminals of the drive circuit.

Figure 6:
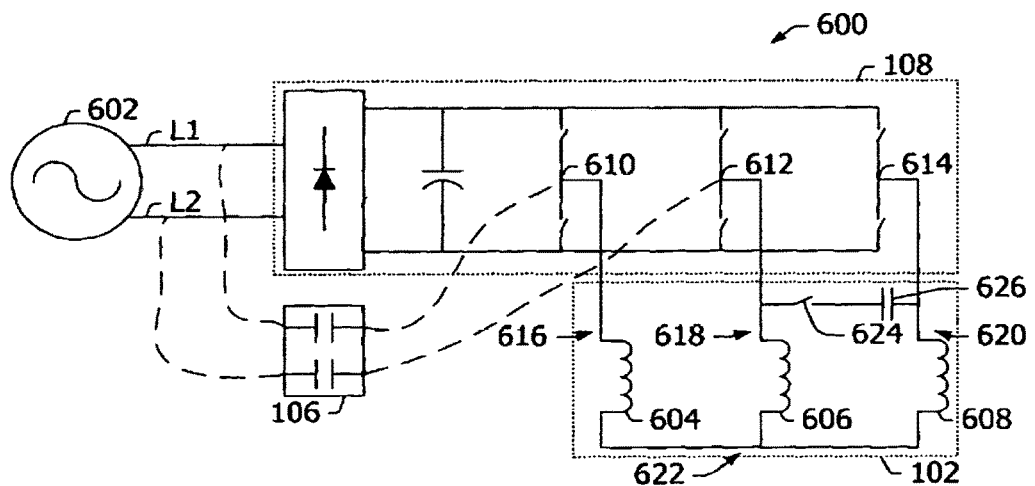
FIG. 6 is a schematic diagram of an exemplary motor system.

FIG. 6 is a schematic diagram of an exemplary motor system 600. Motor system 600 is similar to motor system 100 (shown in FIG. 1) and components of motor system 600 identical to components of motor system 100 shown in FIG. 1 are identified in FIG. 6 using the same reference numerals as used in FIG. 1. In the exemplary embodiment, motor 102 is a three-phase motor, for example, an AC induction motor or an electronically commutated motor, configured to be coupled to a power source 602, where power source 602 is a single-phase AC power source having first and second line inputs L1 and L2. To operate a three-phase motor using single-phase power, it is necessary to create an additional phase at a motor terminal to enable motor 102 to spin correctly. In the exemplary embodiment, motor 102 includes first, second, and third motor windings 604, 606, and 608 arranged in a traditional "wye" connection pattern.

Drive circuit 108 includes inverter 204 (shown in FIG. 2), which is a three-phase inverter that includes a set of inverter switches for each of the three phases. More specifically, inverter 204 includes a first phase output 610, a second phase output 612, and a third phase output 614.

A first side 616 of first winding 604 is coupled to first phase output 610, a first side 618 of second winding 606 is coupled to second phase output 612, and a first side 620 of third winding 608 is coupled to third phase output 614. Respective second sides 622 of first, second, and third motor windings 604, 606, and 608 are all commonly coupled together. Moreover, a switch device 624 and a capacitor 626 are series-coupled between first side 618 of second winding 606 and first side 620 of third winding 608.

During high-speed operation of motor 102 (i.e., drive circuit 108 is not used), bypass contactor 106 and relay 624 are closed to couple first line input L1 directly to first side 616 of first winding 604 to provide the first phase, and to couple second line input L2 directly to first side 618 of second winding 606 to provide the second phase. Series-coupled switch device 624 and capacitor 626 adjust a phase angle of the second phase voltage to generate an artificial third phase, facilitating proper operation of the three-phase motor.

Figure 7:
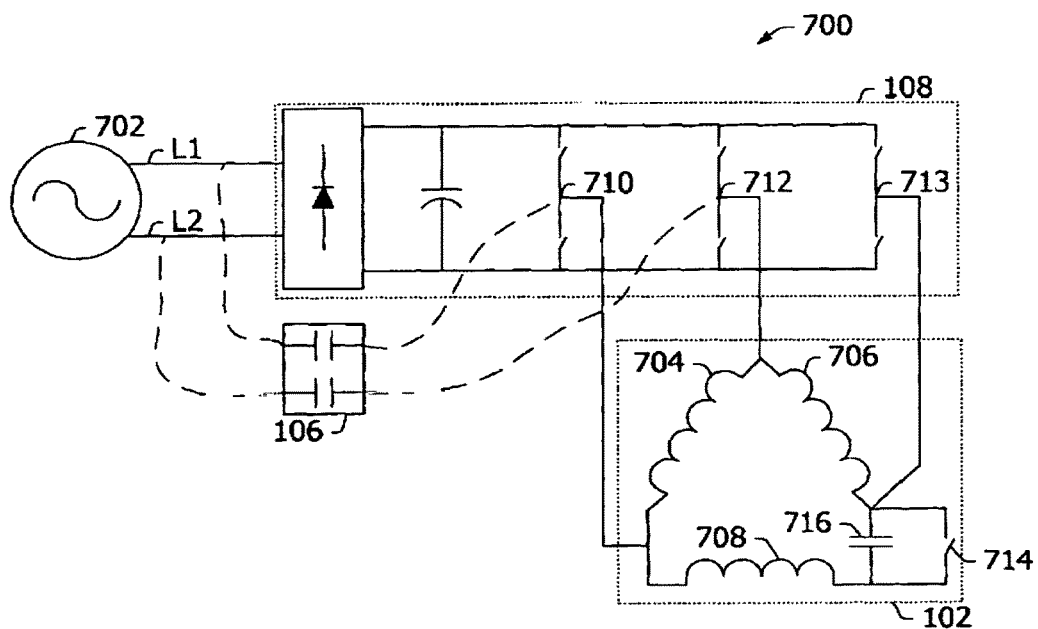
FIG. 7 is a schematic diagram of an exemplary motor system.

FIG. 7 is a schematic diagram of an exemplary motor system 700. Motor system 700 is similar to motor system 600 (shown in FIG. 6) and components of motor system 700 identical to components of motor system 600 shown in FIG. 6 are identified in FIG. 7 using the same reference numerals as used in FIG. 6. In the exemplary embodiment, motor 102 is a three-phase motor, for example, an AC induction motor or an electronically commutated motor, configured to be coupled to a power source 702, where power source 702 is a single-phase AC power source having first and second line inputs L1 and L2. To operate a three-phase motor using single-phase power, it is necessary to create an additional phase at a motor terminal to enable motor 102 to spin correctly. In the exemplary embodiment, motor 102 includes first, second, and third motor windings 704, 706, and 708 arranged in a traditional "delta" connection pattern.

Drive circuit 108 includes inverter 204 (shown in FIG. 2), which is a three-phase inverter that includes a set of inverter switches for each of the three phases. More specifically, inverter 204 includes a first phase output 710 and a second phase output 712 corresponding to first and second motor windings 704 and 706, respectively. A parallel-coupled switch device 714 and a capacitor 716 are coupled to third phase output 713 between second and third motor windings 706 and 708.

During high-speed operation of motor 102 (i.e., drive circuit 108 is bypassed), bypass contactor 106 is closed to couple first line input L1 directly to first phase output 710 to provide the first phase, and to couple second line input L2 directly to second phase output 712 to provide the second phase. Parallel-coupled switch device 714 is open and capacitor 716 adjusts a phase angle of the second phase voltage to generate an artificial third phase, facilitating proper operation of the three-phase motor.

AC motor systems described herein provide a combination of a motor and a drive circuit that provide a more efficient two-speed motor having high-speed and low-speed operating points without requiring an increase in motor frame size, length, and/or active material. More specifically, embodiments of the AC motor systems described herein may utilize a motor having a first rated horsepower in combination with a drive circuit having a second rated horsepower that is lower than the first rated horsepower. It is further realized herein that such an AC motor system may be operated in various configurations, including at the first rated horsepower and at a high-speed operating point by coupling the motor directly to an input power source and bypassing the drive circuit, or at the second rated horsepower and at a low-speed operating point by using the drive circuit to convert the input voltage to an AC voltage for driving the motor, where the AC output voltage is limited by the lower rated horsepower of the drive circuit. It is further realized herein that, by foregoing fully variable speed control at lower speeds by using a VFD, a lower-rated drive circuit may be utilized that has improved efficiency, is smaller in size, and is lower in cost. It is further realized herein that bypassing the drive circuit for high-speed operation of the motor further improves efficiency by eliminating forward operating losses of the variable-voltage variable-frequency drive.

The AC motor system combines the low speed operating points, soft starting, and controlled acceleration benefits of a drive circuit with the line operable, increased power factor, and reduced electromagnetic interference (EMI) signature benefits of an AC induction motor to improve overall system operation and efficiency. More specifically, rather than drive the motor at a nominal 60 Hz regardless load demand, the AC motor system adjusts to lighter loads by reducing the speed of the motor. The drive circuit controls the motor at low-speed operating points to adapt to changing loads, especially in lower output power ranges where fixed-speed AC motors are typically less efficient. Further, at higher output power ranges, the drive circuit may have a reduced power factor, increased EMI signatures, and/or electronic losses. When the frequency commanded by the motor is within the predefined range of line input power frequencies or is at a full loading, the AC motor system bypasses the drive circuit, which provides technical effects including higher power factor, reduced EMI, increased efficiency, and multiple-speed operation. Further, a size, length, and/or active material of the drive circuit may be reduced because the drive circuit does not have to operate at full power, which prevents having to increase the motor frame size to accommodate the drive circuit.

The methods and systems described herein may be implemented using computer programming or engineering techniques including computer software, firmware, hardware or any combination or subset thereof, wherein the technical effect may include at least one of: (a) combining a single-speed motor with a drive circuit for low-speed operation; (b) reducing losses by bypassing the drive circuit when operating at a line voltage, particularly at high operating speeds; (c) operating the motor at a lower-capacity and at a low-speed; (d) improving operating efficiency, e.g., SEER, of the drive circuit and the AC motor system at low-speeds; (e) improving efficiency of the AC motor system further by lowering the rated horsepower of the drive circuit relative to the rated horsepower of the motor to improve efficiency at both low-speed and high-speed operating points; and (f) reducing cost and complexity over fully variable frequency drives.

Some embodiments involve the use of one or more electronic or computing devices. Such devices typically include a processor, processing device, or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a field programmable gate array (FPGA), a digital signal processing (DSP) device, and/or any other circuit or processing device capable of executing the functions described herein. The methods described herein may be encoded as executable instructions embodied in a computer readable medium, including, without limitation, a storage device and/or a memory device. Such instructions, when executed by a processing device, cause the processing device to perform at least a portion of the methods described herein. The above examples are exemplary only, and thus are not intended to limit in any way the definition and/or meaning of the terms processor, processing device, and controller.

In the embodiments described herein, memory may include, but is not limited to, a computer-readable medium, such as a random access memory (RAM), and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are examples only, and are thus not limiting as to the types of memory usable for storage of a computer program.

The systems and methods described herein are not limited to the specific embodiments described herein, but rather, components of the systems and/or steps of the methods may be utilized independently and separately from other components and/or steps described herein.

This written description uses examples to provide details on the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An alternating current (AC) motor system comprising:
a motor having a first rated horsepower and configured to be coupled to a power source;
a drive circuit configured to be electrically coupled between the power source and said motor, said drive circuit having a second rated horsepower that is lower than the first rated horsepower;
a bypass contactor electrically coupled in parallel to said drive circuit, wherein said bypass contactor is configured to:
receive a signal directly from an application controller; and
enable said motor to operate at the first rated horsepower while bypassing said drive circuit;
a drive output contactor electrically coupled in series between said drive circuit and said motor, wherein said drive output contactor is configured to:
receive a signal directly from the application controller; and
enable said motor to operate at the second rated horsepower utilizing said drive circuit.

2. The AC motor system of claim 1, wherein when closed, said bypass contactor facilitates a direct coupling of said motor to the power source.

3. The AC motor system of claim 2, wherein said drive circuit is configured to:
receive a high-speed command signal from the application controller; and
operate of said motor at full speed using line voltage received from the power source, wherein the line voltage is substantially the same as a rated voltage of said motor.

4. The AC motor system of claim 2, wherein said bypass contactor closes upon receiving a high-speed command signal from the application controller, the high-speed command signal including an instruction to operate said motor at a high-speed operating point.

5. The AC motor system of claim 4, wherein to operate at the high-speed operating point, said motor is configured to operate at full speed of said motor using line voltage received from the power source, wherein the line voltage is substantially the same as a rated voltage of said motor.

6. The AC motor system of claim 1, wherein said drive output contactor is further configured to selectively connect and disconnect drive circuit output voltage to and from said motor.

7. The AC motor system of claim 1, wherein said drive circuit comprises a drive circuit controller configured to:
monitor a speed command signal transmitted by the application controller;
determine whether the speed command signal is a low-speed command signal;
when a low-speed command signal is determined, enable said drive circuit to provide output voltage to said motor in accordance with the low-speed command signal; and
when a high-speed command signal is determined, prevent operation of said drive circuit.

8. The AC motor system of claim 1, wherein said drive circuit comprises a drive circuit controller configured to:
monitor a speed command signal provided by the application controller to determine if operation of said drive circuit is called;
when the determination indicates operation of said drive circuit is called, monitor voltage at drive output terminals of said drive circuit;
compare the monitored voltage to a predetermined threshold value; and
prevent operation of said drive circuit to avoid damage when the monitored voltage is equal to or exceeds the predetermined threshold value, wherein monitored voltage meeting the predetermined threshold indicates that line voltage from the power source is present on the drive output terminals of said drive circuit.

9. The AC motor system of claim 1, wherein said drive circuit further comprises:
a current sensor coupled to output leads of said bypass contactor, said current sensor configured to measure current conducted by the output leads and transmit a current measurement signal;
a drive circuit controller is configured to:
receive the current measurement signal from said current sensor;
determine that said motor is operating and line voltage is being applied through the line by the power source when the measured current exceeds a predetermined threshold; and
prevent operation of said drive circuit when it is determined that line voltage is being applied on the line.

10. The AC motor system of claim 1, wherein said drive circuit comprises a drive circuit controller configured to:
monitor at least one voltage at said bypass contactor using a voltage sensor or current in said bypass contactor using a current sensor;
determine line voltage is not present at motor when the at least one of voltage or current is not detected;
monitor a voltage at drive output terminals of said drive circuit to determine whether voltage is present; and
enable said drive circuit to provide output voltage to drive said motor when the voltage monitored at the drive output terminals is below a threshold voltage value.

11. The AC motor system of claim 1, wherein said drive circuit is configured to convert power received from the power source to AC power having a desired voltage and desired frequency to drive said motor at a low-speed operating point.

12. The AC motor system of claim 1, wherein said drive circuit is configured to operate at the second rated horsepower upon receiving a low-speed command signal that includes an instruction to operate said motor at a low-speed operating point.

13. The AC motor system of claim 1, wherein said motor, said drive circuit, and said drive output contactor are enclosed within an integrated motor package.

14. An alternating current (AC) motor system comprising:
a three-phase AC motor having a first rated horsepower and configured to be coupled to a single-phase AC power source, the single-phase AC power source including first and second line input terminals, said three-phase AC motor comprising a first winding, a second winding, a third winding, a series-coupled switch device, and a capacitor;

a drive circuit configured to be electrically coupled between the power source and said motor, said drive circuit having a second rated horsepower that is lower than the first rated horsepower;

a bypass contactor electrically coupled, in parallel with said drive circuit, to the first and second line input terminals and said motor, said bypass contactor configured to enable said motor to operate at the first rated horsepower while bypassing said drive circuit;

wherein the first winding is configured to be coupled to one of a first phase output of said drive circuit or a first line input terminal of the single-phase AC power source via said bypass contactor;

wherein the second winding is configured to be coupled to one of a second phase output of said drive circuit or a second line input terminal of the single-phase AC power source via said bypass contactor;

wherein the third winding is configured to be coupled to a third phase output of said drive circuit, wherein said first, second, and third windings are arranged in a wye connection pattern; and wherein the series-coupled switch device and capacitor are coupled between input sides of said second and third windings, said series-coupled switch device and said capacitor configured to generate a third phase of power when the single-phase AC power source is coupled directly to said motor.

15. An alternating current (AC) motor system comprising:

a three-phase AC motor having a first rated horsepower and configured to be coupled to a single-phase AC power source, the single-phase AC power source including first and second line input terminals, said three-phase AC motor comprising a first winding, a second winding, a third winding, a parallel-coupled switch device, and a capacitor;

a drive circuit configured to be electrically coupled between the power source and said motor, said drive circuit having a second rated horsepower that is lower than the first rated horsepower;

a bypass contactor electrically coupled, in parallel with said drive circuit, to the first and second line input terminals and said motor, said bypass contactor configured to enable said motor to operate at the first rated horsepower while bypassing said drive circuit;

wherein the first winding is configured to be coupled between first and second phase outputs of said drive circuit or to a first line input terminal of the single-phase AC power source via said bypass contactor, wherein the second winding is configured to be coupled between second and third phase outputs of said drive circuit or a second line input terminal of the single-phase AC power source via said bypass contactor;

wherein the third winding is configured to be coupled between first and third phase outputs of said drive circuit, wherein said first, second, and third windings are arranged in a delta connection pattern; and wherein the parallel-coupled switch device and capacitor are coupled between the third phase output and the third winding, said parallel-coupled switch device and said capacitor configured to generate a third phase of power when the single-phase AC power source is coupled directly to said motor.

16. A method comprising:

providing a motor having a first rated horsepower, the motor configured to be coupled to a power source;

electrically coupling a drive circuit between the power source and the motor, the drive circuit having a second rated horsepower that is lower than the first rated horsepower, the drive circuit including a drive circuit controller;

electrically coupling a drive output contactor in series between the drive circuit and the motor; and receiving, at the drive output contactor, a low speed command signal directly from an application controller;

activating, in response to receiving the low speed command signal from the application controller, the drive output contactor to enable operation of the motor at the second rated horsepower utilizing the drive circuit.

17. The method of claim 16, further comprising:

electrically coupling a bypass contactor in parallel to with the drive circuit and between the power source and the motor;

receiving, at the bypass contactor, a high speed command signal directly from the application controller; and activating, in response to receiving the high speed signal command from the application controller, the bypass contactor to enable operation of the motor at the first rated horsepower.

18. The method of claim 17, wherein activating the bypass contactor further comprises closing a circuit between the motor and the power source.

19. The method of claim 17, wherein activating the bypass contactor further comprises:

receiving, at the bypass contactor, the high-speed command signal from the application controller, including an instruction to operate the motor at a high-speed operating point; and activating, in response to receiving the high speed command signal from the application controller, the bypass contactor to enable operation of the motor at the high-speed operating point using line voltage received from the power source.

20. The method of claim 17, further comprising:

monitoring, by the drive circuit controller, a speed command signal, comprising at least one of the low speed command signal and the high speed command signal, transmitted by the application controller;

determining, by the drive circuit controller, whether the speed command signal is the low-speed command signal; and when the low-speed command signal is determined, enabling, by the drive circuit controller, the drive circuit to provide output voltage to the motor in accordance with the low-speed command signal.

21. The method of claim 17, further comprising:

monitoring, by the drive circuit controller, a speed command signal, comprising at least one of the low speed command signal and the high speed command signal, provided by the application controller to determine if operation of the drive circuit is called;

when the determination indicates operation of the drive circuit is called, monitoring, by the drive circuit controller, a voltage at drive output terminals of the drive circuit;

comparing, by the drive circuit controller, the voltage to a predetermined threshold value; and preventing, by the drive circuit controller, operation of the drive circuit to avoid damage when the monitored voltage is equal to or exceeds the predetermined threshold value, wherein the monitored voltage meeting the predetermined threshold indicates that line voltage from the power source is present on the drive output terminals of the drive circuit.

22. The method of claim 16, further comprising:
receiving, by the drive circuit controller, the low-speed command signal from the application controller, the low-speed command signal including an instruction to operate the motor at a low-speed operating point;
converting, by the drive circuit, power received from the power source into AC power having a desired voltage and desired frequency in accordance with the low-speed operating point;
and
driving the motor using the AC power from the drive circuit.

23. The method of claim 16, further comprising enclosing the motor, the drive circuit, and the drive output contactor within an integrated motor package.

* * * * *